(12) United States Patent
Steele

(10) Patent No.: US 12,103,248 B1
(45) Date of Patent: Oct. 1, 2024

(54) SYSTEMS AND METHODS OF BUBBLE CLOSURE FORMATION FOR PACKAGING

(71) Applicant: Mark Steele, New Prague, MN (US)

(72) Inventor: Mark Steele, New Prague, MN (US)

(*) Notice: Subject to any disclaimer, the term of this patent is extended or adjusted under 35 U.S.C. 154(b) by 0 days.

(21) Appl. No.: 18/613,517

(22) Filed: Mar. 22, 2024

Related U.S. Application Data

(60) Provisional application No. 63/454,016, filed on Mar. 22, 2023.

(51) Int. Cl.
B29C 65/74 (2006.01)
B29C 65/00 (2006.01)
B29L 31/56 (2006.01)

(52) U.S. Cl.
CPC ............ *B29C 66/851* (2013.01); *B29C 65/74* (2013.01); *B29C 66/438* (2013.01); *B29C 66/712* (2013.01); *B29C 66/72* (2013.01); *B29L 2031/565* (2013.01)

(58) Field of Classification Search
CPC ..... B29C 66/851; B29C 65/74; B29C 66/438; B29C 66/712; B29C 66/72; B29L 2031/565
See application file for complete search history.

(56) References Cited

U.S. PATENT DOCUMENTS

| | | | |
|---|---|---|---|
| 2,028,843 A | 1/1936 | Pischke | |
| 2,720,903 A | 10/1955 | Pickren | |
| 4,592,493 A | 6/1986 | Smith | |
| 4,913,561 A | 4/1990 | Beer | |
| 5,080,248 A | 1/1992 | Stocchiero | |
| 6,053,635 A | 4/2000 | Anderson et al. | |
| 6,655,837 B2 | 12/2003 | Matsuda et al. | |
| 6,732,889 B2 | 5/2004 | Oren et al. | |
| 6,854,886 B2 | 2/2005 | Piechocki et al. | |
| 7,207,717 B2 | 4/2007 | Steele | |
| 7,828,176 B2 | 11/2010 | Harper | |
| 7,883,268 B2 | 2/2011 | Steele | |
| 8,201,690 B1 | 6/2012 | Gess | |
| 8,613,547 B2 | 12/2013 | Steele | |
| 9,963,284 B2 | 5/2018 | Steele | |
| 10,155,354 B2 | 12/2018 | Steele | |
| 10,301,093 B2 | 5/2019 | Steele | |
| 10,479,041 B2 | 11/2019 | Steele | |

(Continued)

*Primary Examiner* — Daniel H Lee
(74) *Attorney, Agent, or Firm* — Skaar Ulbrich Macari, P.A.

(57) ABSTRACT

Methods, systems, and apparatuses of a fluid bubble valve device or element can comprise a plurality of films or webs aligned over the top of each other. For example, two separate webs or film layers of material can be made with two or more different layers of films combined to provide different necessary benefits in manufacturing or forming the valve and sealing to a pouch or package later. The two individual forming webs or film layers are fed into a machine together where channel seals and a bubble pocket are created to form a pathway for a controlled direction for a fluid product to later flow through when the completed pouch or package is used by the consumer. The pocket is formed on both of the two individual forming webs or film layers at the same time. A separate lidding web or layer of material is introduced and sealed over the underside of the bubble pocket to trap air or gas between the lidding layer and the combined individual forming webs or film layers.

16 Claims, 10 Drawing Sheets

(56) References Cited

U.S. PATENT DOCUMENTS

| | | |
|---|---|---|
| 11,014,718 B2 | 5/2021 | Ludwig |
| 11,130,617 B2 | 9/2021 | Ludwig et al. |
| 11,214,416 B2 * | 1/2022 | Ludwig .............. B65D 47/2018 |
| 11,370,584 B2 * | 6/2022 | Ludwig .............. B65D 47/2018 |
| 11,505,383 B2 | 11/2022 | Steele |
| 2011/0042407 A1 | 2/2011 | Steele |
| 2016/0297571 A1 * | 10/2016 | Steele ................ B65D 47/2031 |
| 2017/0355502 A1 | 12/2017 | Steele |
| 2021/0347536 A1 | 11/2021 | Ludwig et al. |
| 2023/0128948 A1 | 4/2023 | Ludwig |
| 2023/0132169 A1 | 4/2023 | Ludwig |

* cited by examiner

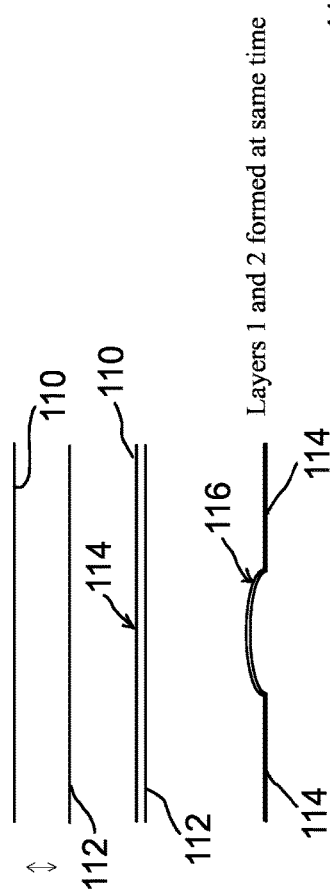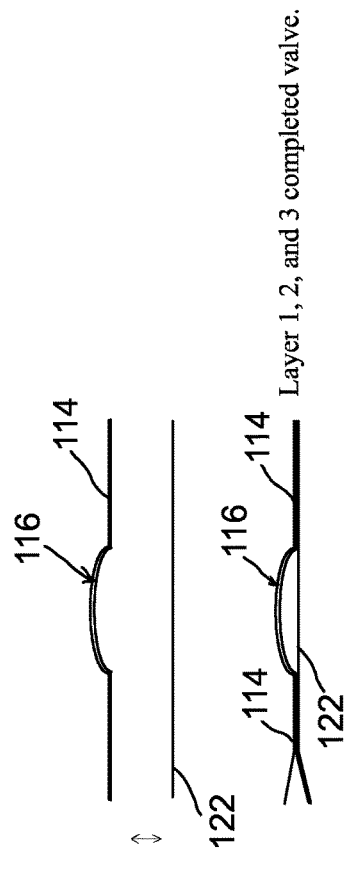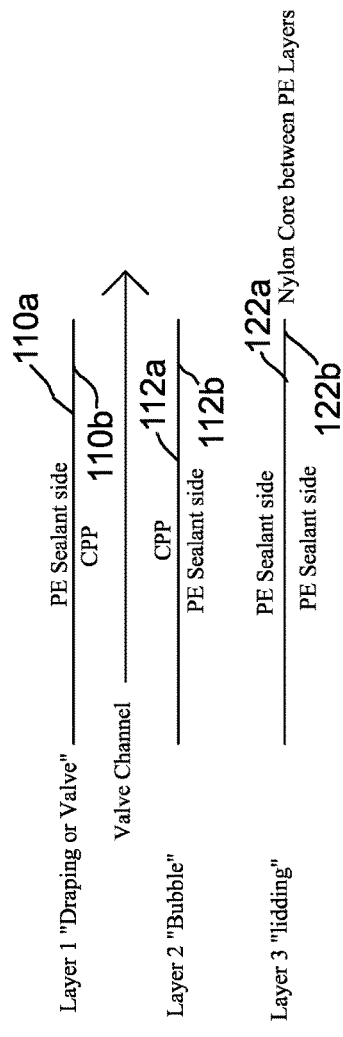

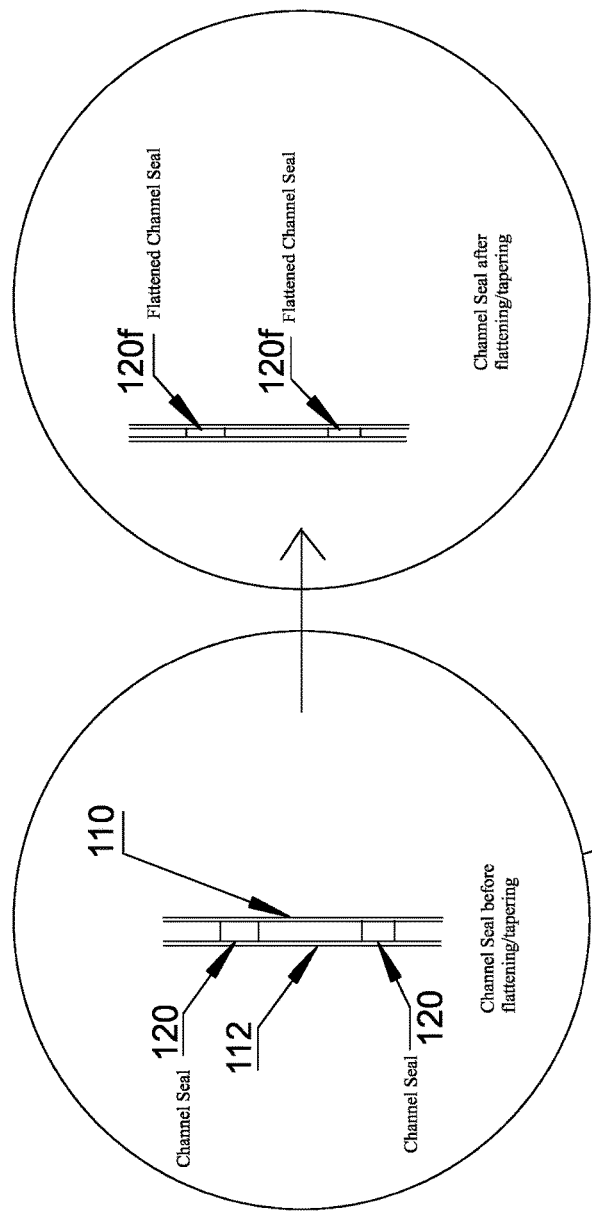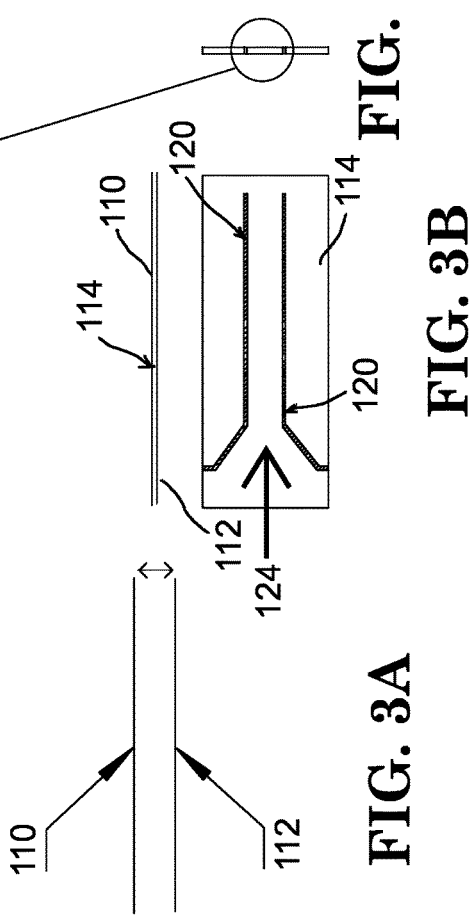

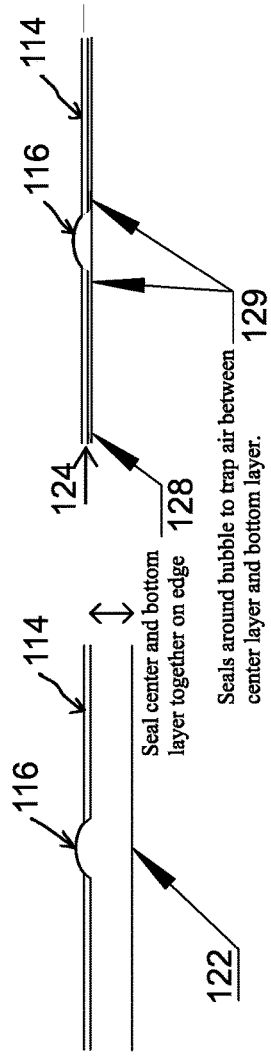
FIG. 5
FIG. 6
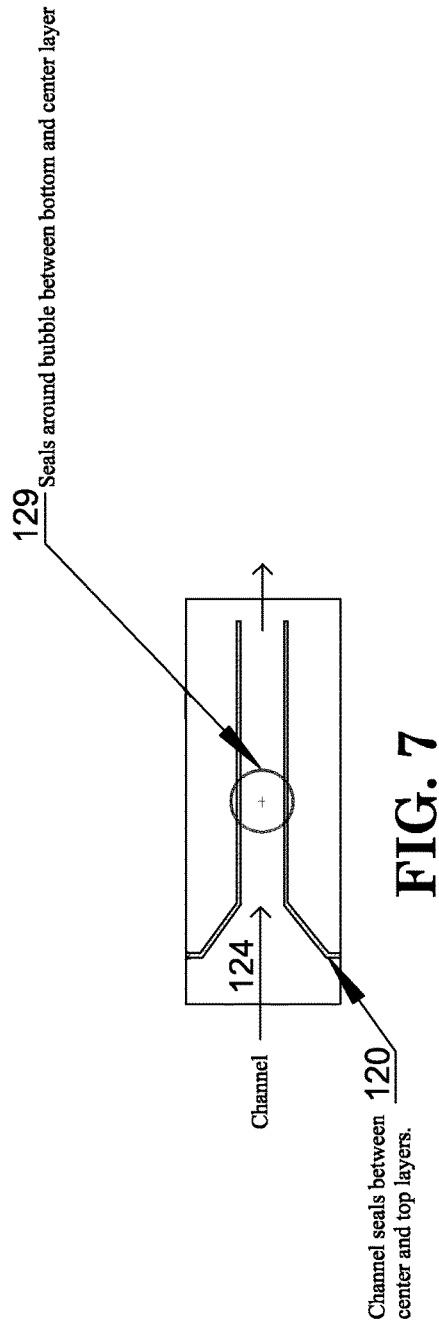
FIG. 7
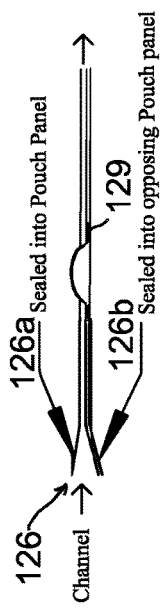
FIG. 8

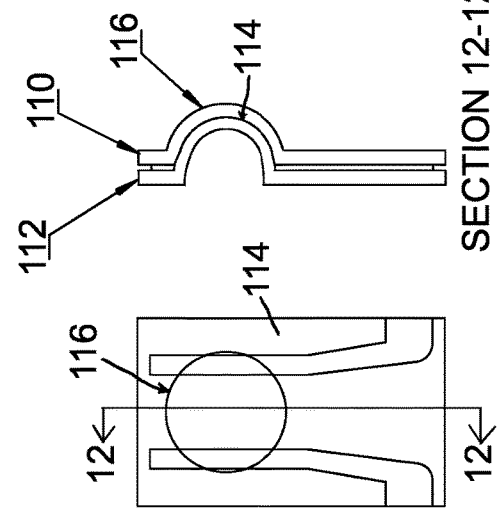
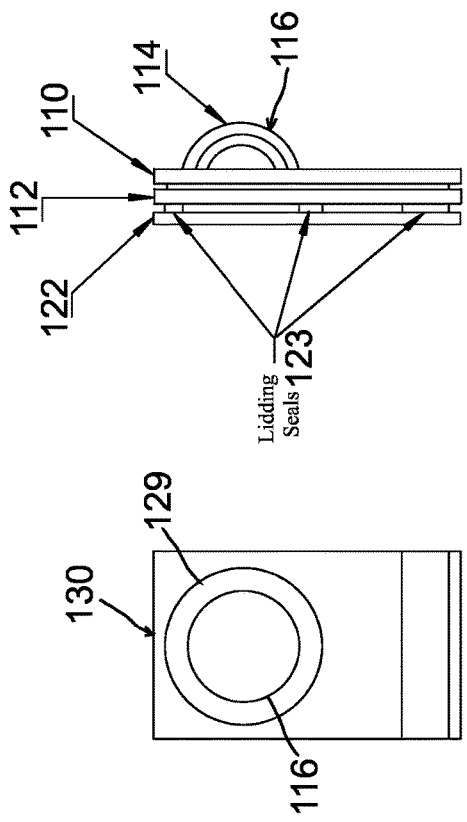
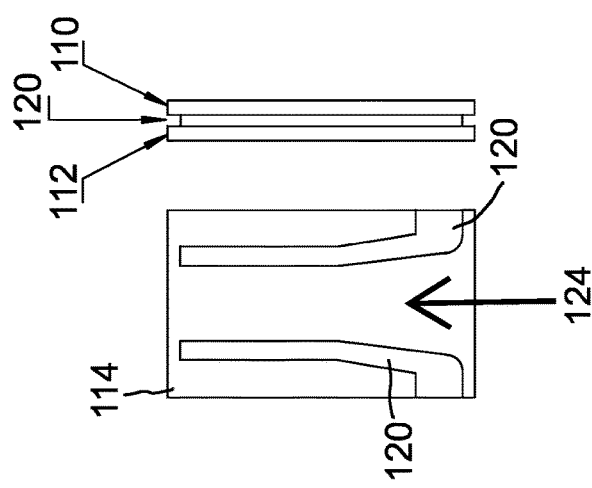

Valve with Registration Punch

Valve Channel and Bubble Seal

SYSTEMS AND METHODS OF BUBBLE CLOSURE FORMATION FOR PACKAGING

CROSS-REFERENCE TO RELATED APPLICATIONS

The present application claims priority to and the benefit of U.S. Provisional Patent Application Ser. No. 63/454,016, filed Mar. 22, 2023, which is fully incorporated herein by reference.

FIELD

The present invention relates generally to packaging and, more particularly, to using formable films or film layers to create a bubble or valve construct for sealing to a package to control dispensing of fluid from the package, such as a flexible package.

BACKGROUND

Typically, when formable flexible packaging materials are formed, they are formed to create a pocket to place product into, e.g., via thermoforming. A separate material is used, typically called lidding material, to seal over the pocketed area after the product has been placed into the formed pocket.

In addition, certain processes may make it difficult to register multiple pockets for forming a valve.

As a result, there is a need for a system and method to improve on conventional techniques and solve the various issues that come with existing valve formation methods, such as cost, efficiency, and registering issues.

SUMMARY

The present invention can comprise embodiments including two or more forming films or webs, aligned one over the top of the other. These are separate webs or sections of material which can be made with two or more different layers of films that provide different necessary benefits in manufacturing the valve and sealing to the package later. The two individual forming webs, or a single web that is slit and placed or folded over itself to make two webs, are fed into a machine together where channel seals are made to seal them together in a select area. A pocket is then formed on both webs at the same time. In various embodiments, a portion of the films is shaped as a formed bubble pocket by a rotary machine or other known process. Once the pockets are formed in each of the two films/webs, the two films/webs go into another section of the machine and a "lidding" web is introduced and sealed over the underside of the pocketed area to trap air or gas between the lidding layer and the center layer of film to create a bubble valve device or element.

The above summary is not intended to describe each illustrated embodiment, claimed embodiment or implementation of the invention. The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

The invention may be more completely understood in consideration of the following detailed description of various embodiments of the invention in connection with the accompanying drawings, in which:

FIGS. 1A-1B show side views of the steps for joining, forming, and shaping a valve bubble device from multiple films and layers, in accordance with embodiments of the present invention.

FIG. 2 shows a side exploded view of the material construct of multiple films and layers of the valve bubble device, in accordance with embodiments of the present invention.

FIG. 3A shows a side view of the steps of joining two film layers, in accordance with embodiments of the present invention.

FIG. 3B shows views of sealing the two film layers of FIG. 3A to create channel seals and a fluid channel, in accordance with embodiments of the present invention.

FIG. 3C shows a side view of the sealed film layers of FIG. 3B, in accordance with embodiments of the present invention.

FIG. 3D shows an expanded and close-up view of the film layers and channel seals of FIG. 3C, in accordance with embodiments of the present invention.

FIG. 3E shows a side expanded and close-up view of the channel seals of FIG. 3D flattened, in accordance with embodiments of the present invention.

FIG. 4 shows views of the combined film layers and a shaped bubble pocket prior to attachment a lidding film or layer, in accordance with embodiments of the present invention.

FIG. 5 shows side views of the joining of the lidding layer to the combined film layer, in accordance with embodiments of the present invention.

FIG. 6 shows a side view of sealing the lidding layer to the combined film layer and application of a bubble seal, in accordance with embodiments of the present invention.

FIG. 7 shows a top view of the bubble seal, and channel seals to define the fluid channel, in accordance with embodiments of the present invention.

FIG. 8 shows a side view of the valve bubble device with a V-shaped end portion to facilitate attachment to panels of a pouch or package, in accordance with embodiments of the present invention.

FIG. 9 shows views, including a side expanded and close-up view, of layers of a valve bubble device including a channel seal area, in accordance with embodiments of the present invention.

FIG. 10 shows a side expanded and close-up view of the channel seal area of FIG. 9 flattened or tapered, in accordance with embodiments of the present invention.

FIG. 11 shows a top view of two layers of a valve bubble device, with a shaped bubble pocket, sealed together to form the combined film layers, in accordance with embodiments of the present invention.

FIG. 12 is a side cross-section view of FIG. 11 across section 12-12, in accordance with embodiments of the present invention.

FIG. 13 shows a top view of a completed valve bubble device, in accordance with embodiments of the present invention.

FIG. 14 shows a side expanded and close-up view of the completed valve bubble device of FIG. 13, in accordance with embodiments of the present invention.

Figure 16:
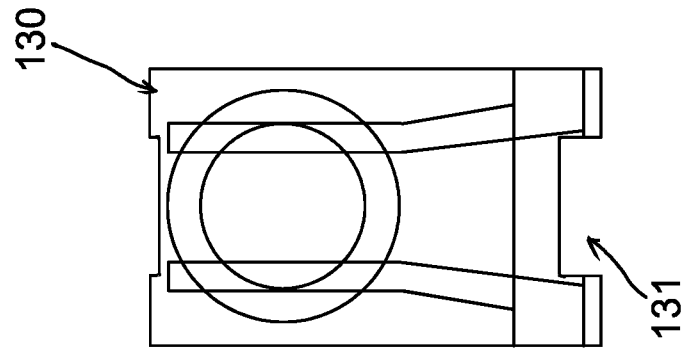
FIG. 16 shows a top view of a completed valve bubble device including one or more registration punches, in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims. Further, various views in the exemplary drawings are extended or close-up views, with the sizes of structures exaggerated or enlarged to provide clarity and to better depict the structures of the invention.

DETAILED DESCRIPTION OF THE INVENTION

The present invention can comprise embodiments including two forming films or webs, aligned one over the top of the other. These two separate webs or sections of material can be made with two or more different layers of films that provide different necessary benefits in manufacturing the valve and sealing to the package later. The two individual forming webs are fed into a machine together where channel seals are made to form a pathway for a controlled direction in which product will later flow through when the completed package is used by the consumer.

Further, when the films are sealed together, the edges of the seals can form an undesirable ridge and/or fluid channel that can be flattened or tapered along a portion, a length, at ends, or edges to facilitate the proper function of the valve, e.g., primarily for thin liquids. Flattening or tapering along a portion, length, at ends, or edges of the channel seals reduces or minimizes the ridges or tiny channels created by the sealing process that creates the channel seals. A pocket is then formed on both webs at the same time at the approximate location along the channel seals. In various embodiments, a portion of the films is shaped as a formed bubble pocket by a rotary machine or like process. Once the pockets are formed in each of the two films/webs, the two films/webs go into another machine section or process and a third "lidding" web is introduced and sealed over the underside of the pocketed area to trap air or gas between the lidding layer and the center layer of film to create a bubble-shaped valve device. The bubble seals are typically made outside the area of the channel seals to ensure the air within the bubble is in full contact across a desired section of the channel area. The construct, e.g., dimensions, proportions, shape, and size, of the bubble valve can vary depending on various specifications and uses, such as the dispensing of liquids having various viscosities. A lower or flatter bubble valve (e.g., lower apex) can be used for controlling flow of fluid product within the package when the fluid is a thicker liquid with a higher viscosity. A higher or deeper formed bubble valve (e.g., higher apex) can be used for a thinner liquid having a lower viscosity (e.g., water, alcohol, etc.), where more resistance of the bubble valve against the fluid and the fluid flow is desired. Moreover, the size and shape of the bubble valves can be configured to require more or less squeeze pressure on the package from the user in order to expel or dispense fluid through the bubble valve and out of the package. For example, if it was desirable to make it easier for the user to squeeze a higher viscosity fluid product through the bubble valve, the bubble valve could be configured with a lower height (e.g., lower apex).

The present invention solves the issue of registering a second formed pocket exactly over a first formed pocket in making the bubble-shaped valve device, ensuring a precise and exact match, every time. The forming process can be accomplished by means of thermoforming, or a mechanical forming method with an anvil and die, or a combination of both.

Referring generally to FIGS. 1A-25, the present invention prevents, hinders, or controls the traversal of liquid past a bubble closure valve device or element until the user/consumer has squeezed a package or pouch to push the liquid through a channel area of the valve and out of the pouch or package. This is achieved by controlling the tightness of the relationship between two formed pockets such that the two formed pockets can be accurately and precisely registered and nested together. The thinner the liquids (e.g., low viscosity), the more important this is. In addition, the precision construct of the bubble closure valve device or element of the present invention also ensures that liquid product will not leak (even thin, low viscosity liquid) via the bubble closure valve device or element when the corresponding pouches or packages are tipped over, tilted, or inverted (e.g., turned upside down).

Referring to FIGS. 1A-1B, embodiments of the present invention include a plurality of films or webs, e.g., at least a third/valve film layer 110 and a second/center film layer 112, placed or combined together, e.g., via sealing or without sealing, to create a new combined film material or layer 114. A convex bubble or valve pocket 116 is formed in a portion of the film material 114 (e.g., into layers 110, 112, at the same time). A first lidding film layer 122 is sealed or otherwise provided to the film material 114 (e.g., sealed to film layer 112) below, across, or around the bubble pocket 116 to create a completed bubble valve device or element 130, as depicted in FIG. 1B. The lidding layer 122 can also be sealed along or at ends of the film material (e.g., film layer 112). These seals are provided to ensure fluid flow between the film layers 110, 112 and prevent fluid flow between the film layers 112, 122. In certain embodiments, one or more unsealed and generally one or more V-shaped end portions 126 are defined to allow free layer separation between ends of the film layers 110, 112 and the lidding layer 122. The end V-shaped end portion 126 includes free ends 126a, 126b for sealing to the pouch or package.

FIG. 2 provides exemplary, but not limiting, material constructs for the various layers 110, 112, and 122. For instance, in certain embodiments, the film layer 110 can include a top sealant surface or layer 110a constructed of Polyethylene (PE) and a bottom surface or layer 110b constructed of Cast Polypropylene (CPP). The film layer 112 can include a top surface or layer 112a constructed of CPP and a bottom sealant surface or layer 112b constructed of PE. As further detailed below, a fluid valve channel is defined between the bottom CPP surface/layer 110b of film layer 110 and the top CPP surface/layer 112a of film layer 112. The lidding layer 122 can include a top surface or layer 122a and a bottom surface or layer 122b, both constructed of a sealant PE. In various embodiments, the lidding layer 122 can be a single PE layer of material. Other materials and material combinations can be employed to achieve the desired and/or required manufacturing, forming, and sealing benefits of the present invention.

FIGS. 3A-16 show embodiments of the bubble valve element 130 and exemplary manufacturing or formation steps to create the bubble valve element 130 of the present invention. To solve valve registration formation issues, the forming films or webs 110, 112 are aligned, one over the top of the other. These are separate webs or sections of material which are typically made with two or more different layers of films themselves (e.g., each layer can comprise multiple layers of coextruded or laminate materials), that provide different necessary benefits in manufacturing, forming, and/ or sealing the valve 116, 130 and sealing the complete bubble valve element 130 to the package later. The individual layers are typically made up of PP, PE, Nylon, Polyester, and other like film types or film combinations, either coextruded or laminated together to provide the required benefits.

FIGS. 3A-4 show the first and second film layers 110, 112 being brought together to create the combined film layer 114 and fluid valve channel 124, which is defined by one or more channel seals 120. Such a configuration and method of creating the channel seals 120 before the forming of the bubble pocket 116 is beneficial in avoiding popping or compromising the film of the bubble pocket 116. This, in turn, allows for the channel seals 120 to be closer aligned with the top or apex of the bubble pocket 116, which creates a better functioning bubble closure device, wherein the two layers 110, 112 are exactly aligned and matched up before the air or gas is trapped within the bubble pocket 116 with the sealing of the lidding layer 122. As detailed herein, when the films are sealed together, the edges of the seals can form an undesirable ridge and/or fluid channel that can be flattened or tapered along a portion, a length, at ends, or edges to facilitate the proper function of the valve, e.g., primarily for thin liquids.

FIGS. 5-8 show the film layers 110, 112 (114) and 122 being brought together and sealed at seal portions 128. As such, one or more seal portions 128 seal the center film layer 112 to the lidding film layer 122, and one or more seal portions 129 are provided around the bubble pocket 116 to trap air between the center film layer 122 and the lidding film layer 122 in the bubble pocket 116. The trapping of air or gas into the formed pocket 116 by sealing the lidding film layer 122 only to the underside of the center film layer 112 of the three layer construction is beneficial to avoid applying a functional seal between the two previously formed webs or layers 110, 112 (e.g., making up the combined film material or layer 114).

FIG. 8 shows the completed valve 130 device or element, including the defined fluid valve channel 124, the channel seals 120, and the one or more seal portions 129 around the bubble pocket 116. Further, the end portions 126 are shown for sealing, or otherwise attaching, to a corresponding package or pouch panel.

In various embodiments, as explained above, the two individual forming films/webs 110, 112 are made with a CPP on one side and a PE to form the new film material 114. These films/webs 110, 112 are placed such that the CPP sides are facing one another. The films/webs 110, 112 are then fed into a machine where the channel seals are made, and then flattened in certain embodiments, for a select pathway for the pouch or package contents to pass through at a stage where the consumer will use the completed package. The films/webs 110, 112 are then fed into a forming machine together and the pocket 116 is formed on both webs at the same time.

FIGS. 9-16 depict various views, including exploded views, of the bubble valve formation process and the final bubble valve element 130.

As shown in FIGS. 9-14 (and FIGS. 3A-3E), the film layers 110, 112 are joined to define the fluid valve channel 124 (FIG. 9) and the channel seals 120 can be flattened or shaped 120f (FIG. 10). The channel seals 120 can be flattened (120f) in certain embodiments during the formation process to better control fluid flow through the bubble valve element 130. Again, when the films are sealed together, the edges of the seals can form an undesirable ridge and/or fluid channel that can be flattened or tapered along a portion, a length, at ends, or edges 120f to facilitate the proper function and precision performance of the valve, e.g., primarily for thin, low viscosity liquids. Flattening or tapering of the channel seals 120 reduces or minimizes the ridges or tiny channels created by the sealing process that creates the channel seals 120. The degree or level of flattening can vary depending on the particular configuration needed for liquid flow through the fluid valve channel 124, e.g., the lower the viscosity of the liquid, the more the channel seals are flattened to ensure proper liquid flow, without leaking or undesirable expelling of the liquid. A package designed for dispensing thicker, higher viscosity liquids may not require any, or simply minimal, flattening of the channel seals 120. In various embodiments, the flattened seals 120f can be created using a shaped bar, a roller, or other known techniques and mechanisms. The shaped bar can be a "cooled" bar and can be applied to the channel seals 120 right after creation of the channel seals 120. This ensures that the film material is still pliable/malleable to facilitate the flattening process.

Figure 15:
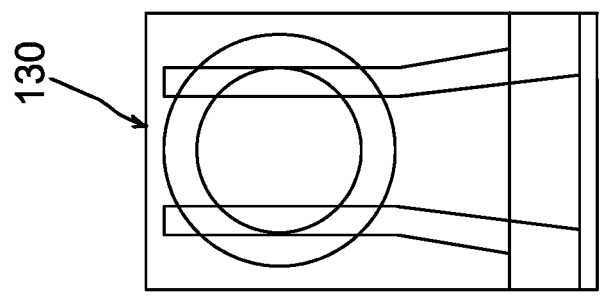
FIG. 15 shows a top view of a completed valve bubble device showing the channel seals and bubble seal, in accordance with embodiments of the present invention.

The bubble pocket 116 is formed with film layers 110, 112 with the one or more seal portions 129 around the bubble pocket 116 (FIGS. 13-14). The bottom lidding layer 122 is then sealed or applied to the bottom of the central film layer 112 at one or more seals 123 (FIG. 14) to create the completed bubble valve element 130 (FIG. 15). A registration notch or punch 131 can be provided in a portion of the bubble valve element 130 (FIG. 16).

Figure 17:
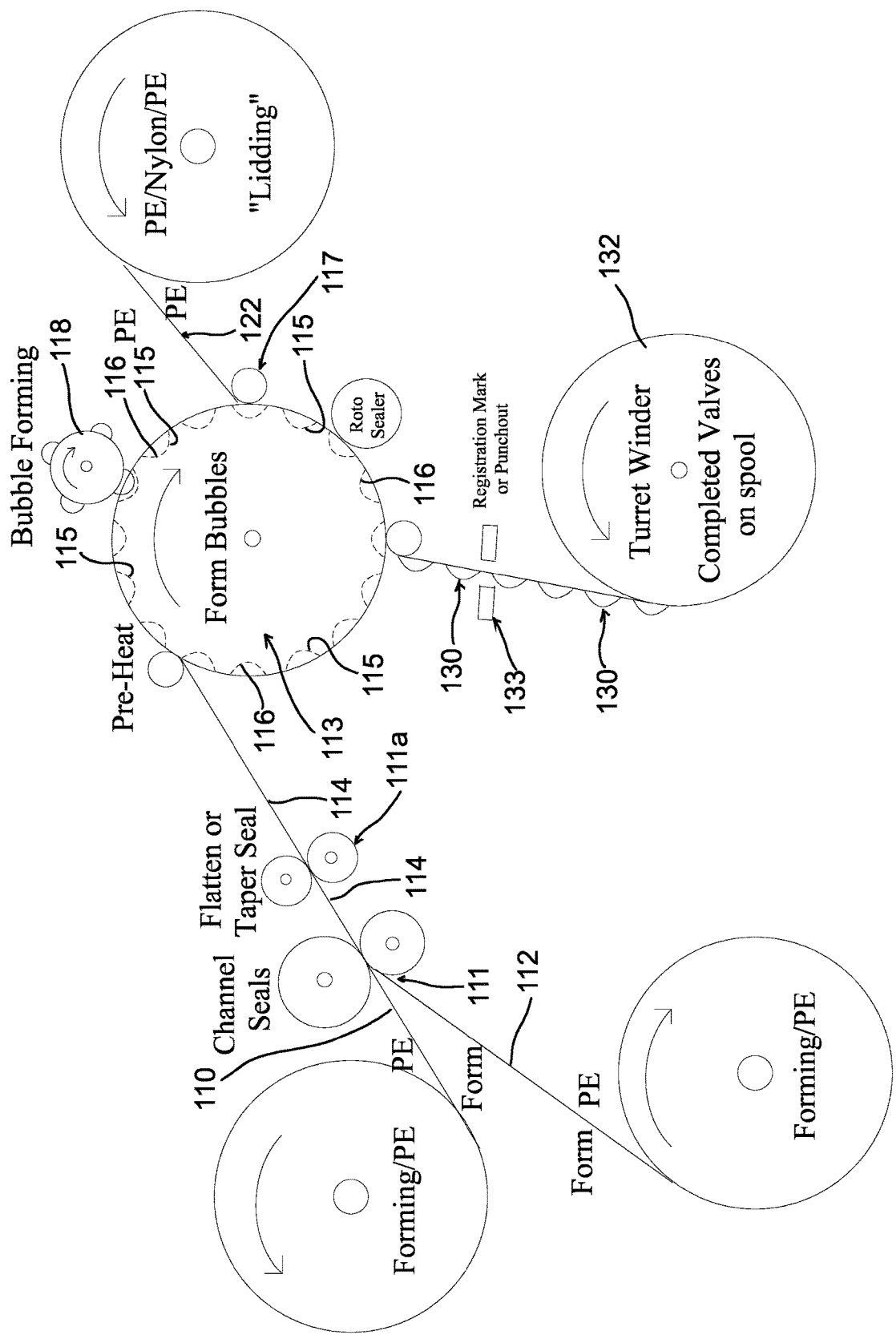
FIG. 17 shows a valve bubble device manufacturing and formation system, in accordance with embodiments of the present invention.
Figure 18:
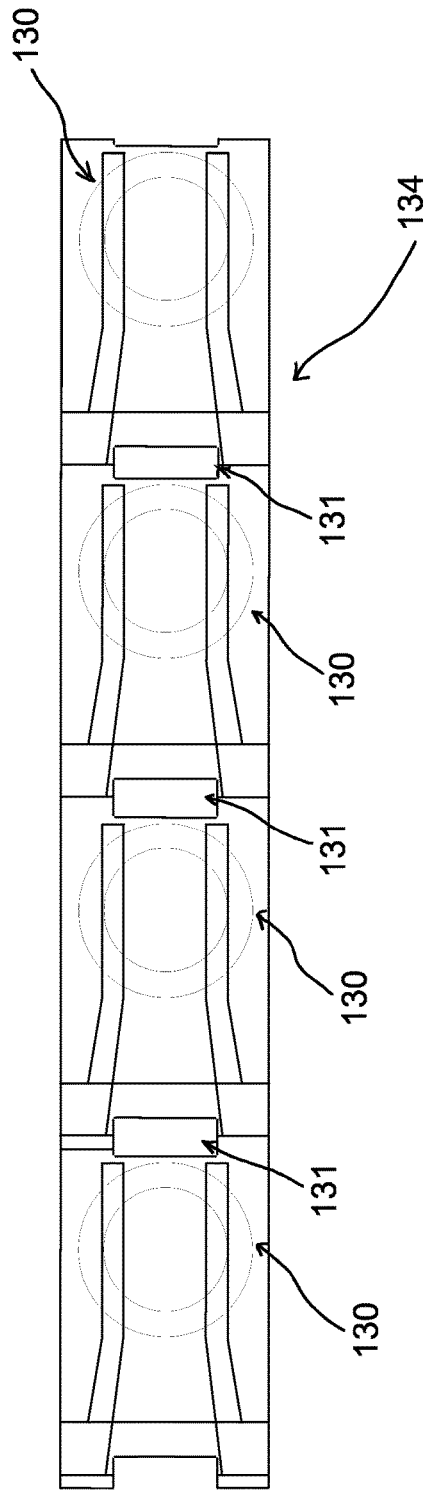
FIG. 18 shows multiple formed valve bubble devices serially connected along a portion of a chain coming off of the manufacturing and formation system of FIG. 17, in accordance with embodiments of the present invention.
Figure 19:
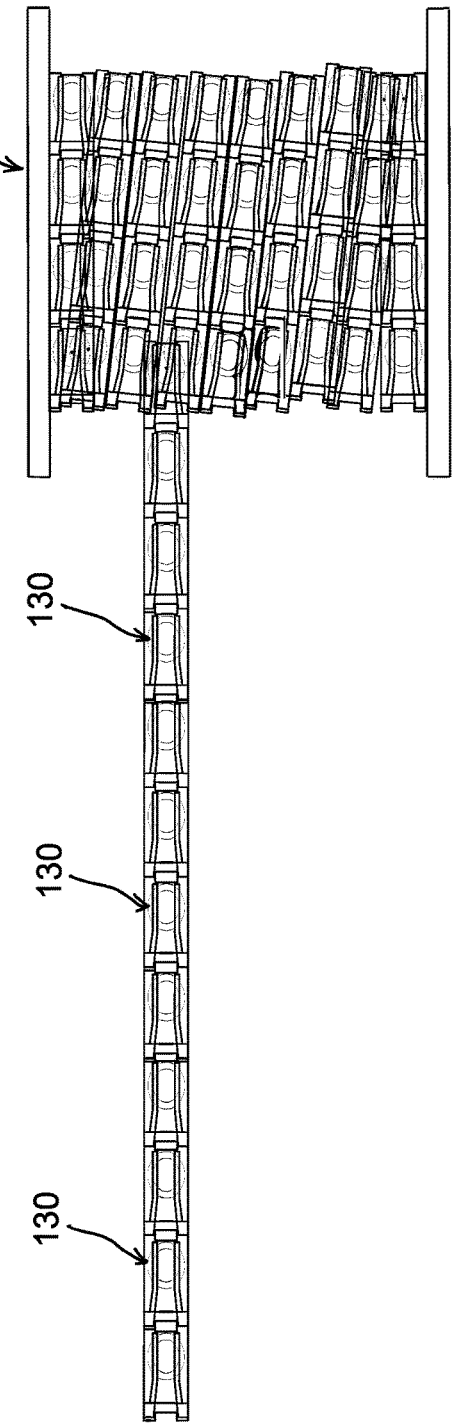
FIG. 19 shows the chain of serially connected valve bubble devices wound onto a spool, in accordance with embodiments of the present invention.
Figure 21:
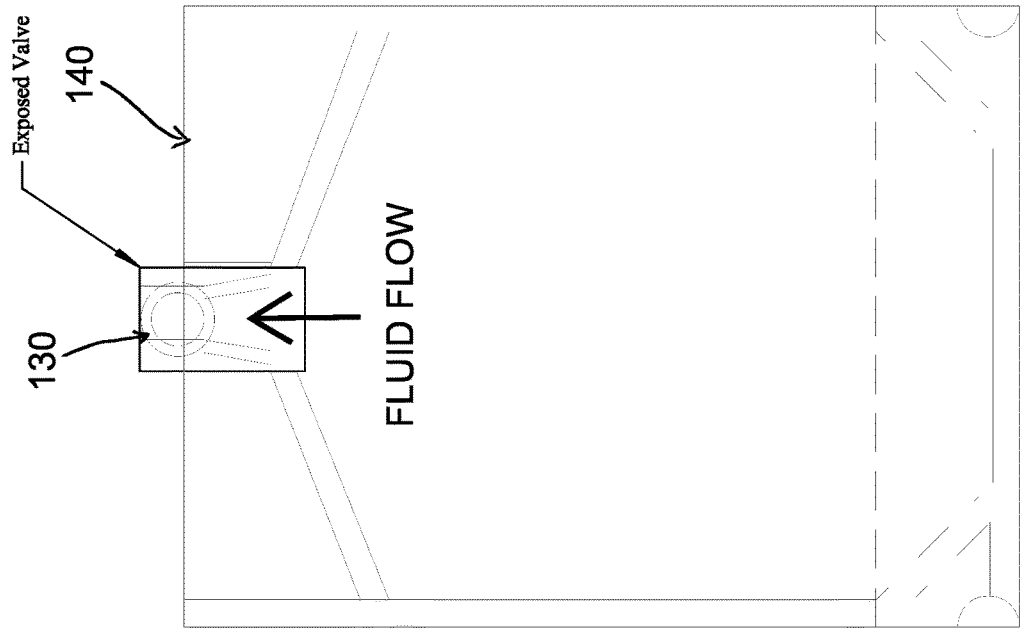
FIGS. 20-25 show exemplary pouches or packages incorporating the valve bubble device incorporated for controlled dispensing of fluid from the pouches or packages, in accordance with embodiments of the present invention.
Figure 20:
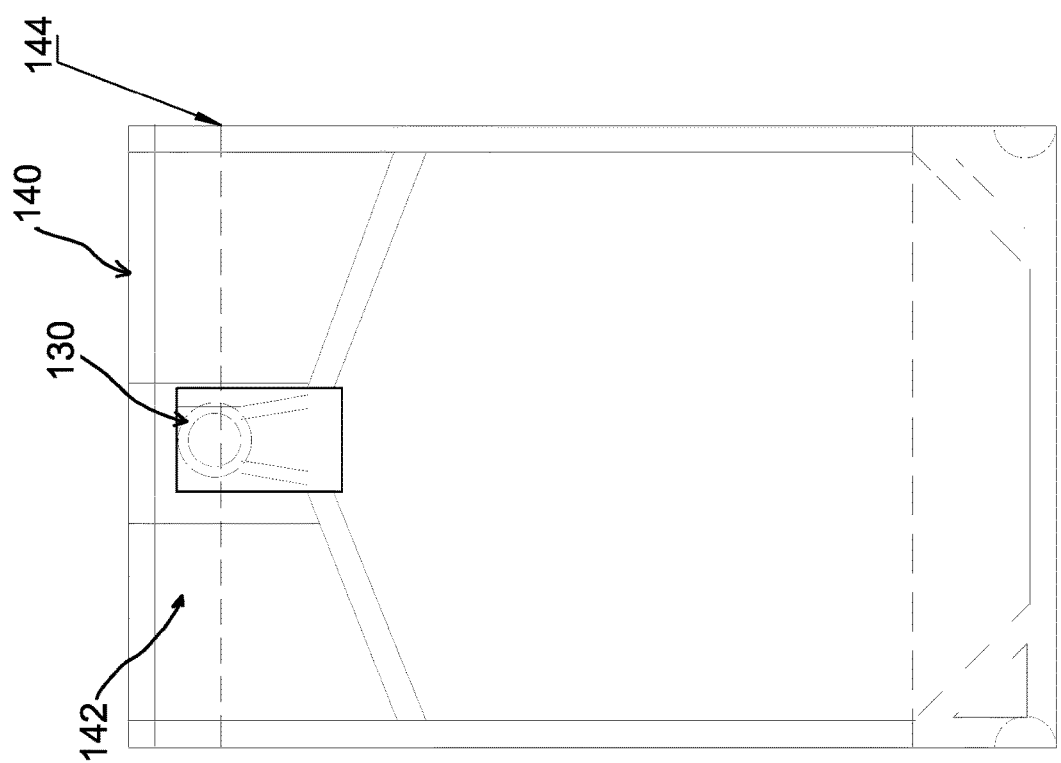
Figure 23:
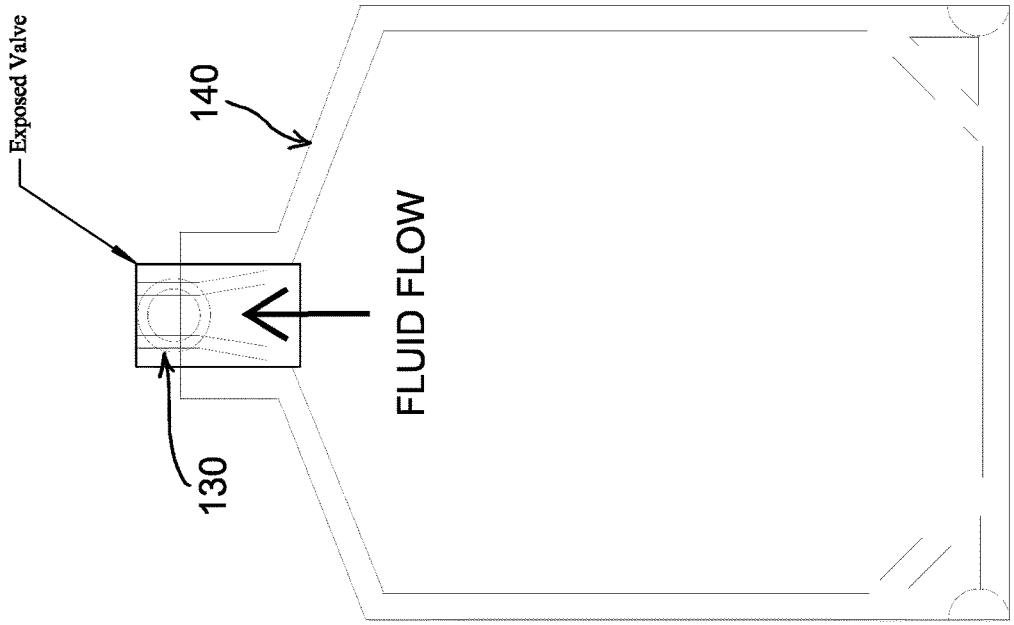
Figure 22:
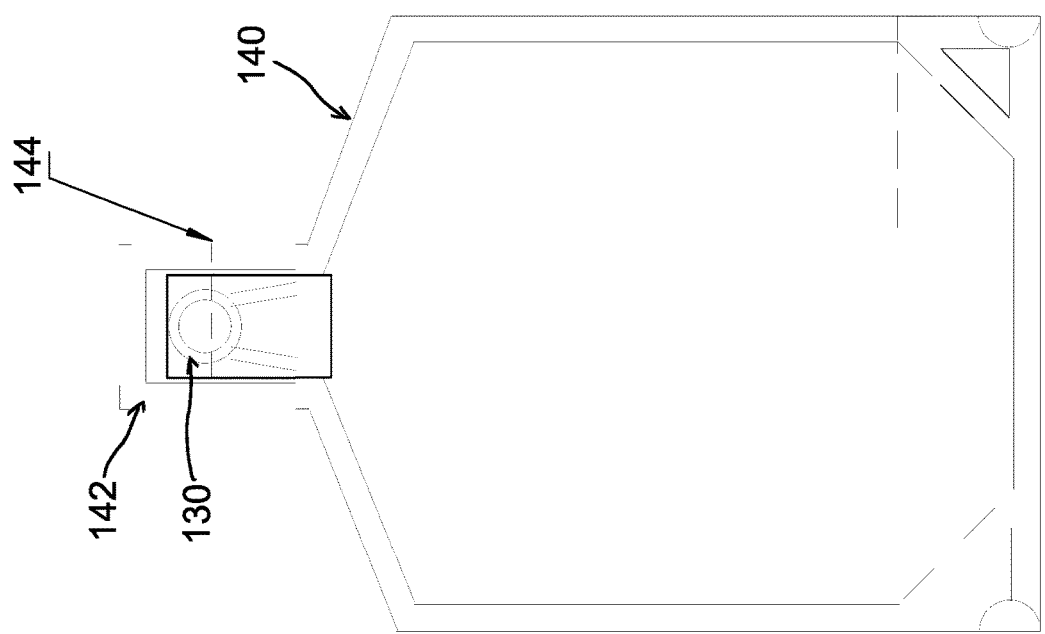
Figure 25:
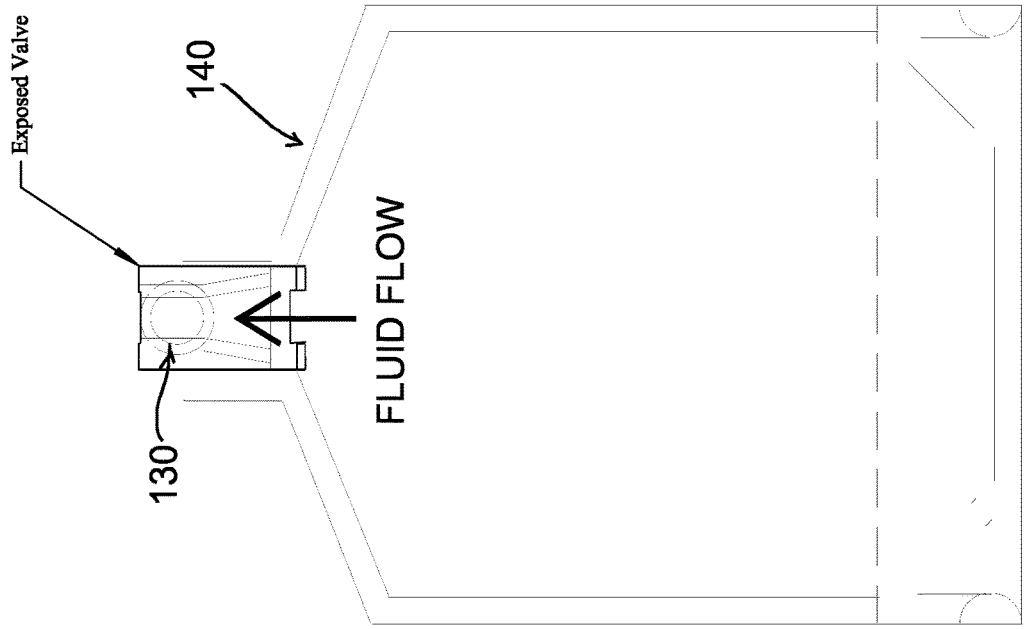
Figure 24:
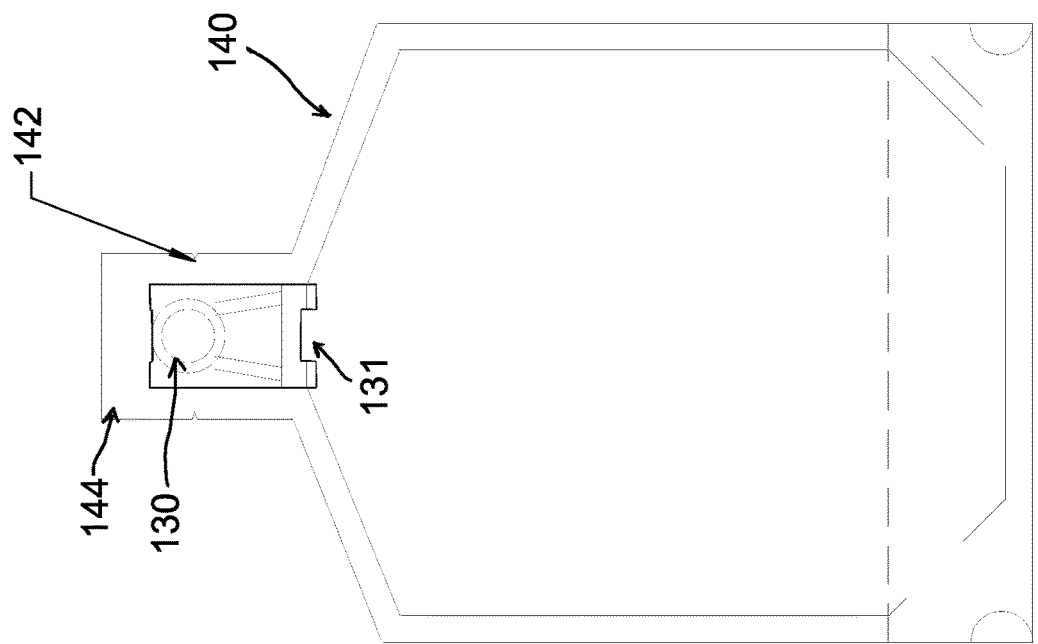

As shown in FIGS. 17-19, one or more embodiments of the present invention can employ a manufacturing and formation system. A forming machine 113 (e.g., rotary in example embodiments) having a plurality of pockets or cavities 115 defined along the perimeter or circumference of the machine 113 receive or draw in portions of the film material 114 (e.g., the joinder of film layers 110, 112) via one or more forming dies 118, or like equipment and techniques. A portion of the film 114 is, therefore, shaped as the bubble pocket 116 formed within the cavities 115 of the machine 113, e.g., via the forming die 118. Other non-rotary equipment and techniques can be employed as well to shape or form the bubble pocket. The bubble pocket 116 can be formed in different sizes, shapes, and configurations to match the viscosity of the liquid it is designed to hold back in use. As detailed above, a lower or flatter bubble valve (e.g., lower apex) can be used for controlling flow of fluid product within the package when the fluid is a thicker liquid with a higher viscosity. A higher or deeper formed bubble valve (e.g., higher apex) can be used for a thinner liquid having a lower viscosity (e.g., water, alcohol, etc.), where more resistance of the bubble valve against the fluid and the fluid flow is desired. As such, the cavities and/or the forming die can be constructed in a myriad of sizes, shapes, and orientations to provide the desired bubble pocket 116 structure and configuration. The channel seals 120 can be created on these webs or film layers prior to being formed or, alternatively, defined later after the pocket 116 is formed.

Prior to entering or feeding into the machine 113, the individual webs or layers 110, 112 can be fed through a channel seal station 111 to define the channel seals 120 and seal the webs or layers 110, 112 together for the combined web or film layer 114. Next, the channels seals 120 can be flattened or tapered at a flattening station 111a.

Once the pockets 116 are formed, the webs or layers 110, 112 are fed into another section 117 of the machine where the third lidding web or film layer 122 is introduced and sealed over the underside of the bubble pocket 116 to trap the air or gas between the lidding film layer 122 and the center layer of film 112 within the bubble pocket 116. For this example, the lidding film layer 122 is made up of PE on both sides, and alternatively with a Nylon or "stiffening" layer of film sandwiched therebetween. The layers of the lidding material can be bonded together by either a lamination, co-extrusion, or like process.

Next, if the channel seals 120 were not made prior to the formation stages, the channel seals 120 will then be made or defined between the two forming film layers 110, 112 (e.g., FIG. 9). These channel seals 120 will direct the liquid, through the channel 124, from within the pouch or package to the bubble valve element 130 that was created. The bubble valve element 130 will stop the liquid from passing by it and exiting the pouch until enough pressure is exerted on the pouch to force the liquid past the entrapped air in the bubble valve element 130 though the valve channel 124 that was created between the two forming web layers (e.g., layers 110, 112).

Other seals may be made on or in the bubble valve element 130 to seal different layers of the film layers (e.g., three or more film layers) to themselves at different locations to assist with the function of the bubble valve element 130 (e.g., seals added along sides or longitudinal edges to stiffen the valve and assist in preventing kinking), the forming of the bubble valve element 130, as well as the sealing of the bubble valve element 130 to the pouch or package. The valve can be placed in a pre-made pouch or package to be filled and sealed at a later date, or added to a package during the form, fill, and seal stages of making the pouch or package.

A registration notch or punch 131 can be provided in a portion of the bubble valve element 130 at punch station 133. The registration notch or punch 131 is provided to register the bubble valve elements 130 when cutting or otherwise removing a bubble valve element 130 from a serial chain 134 of bubble valve elements 130.

In various embodiments, both the forming and sealing steps of the process can be performed using a rotary or continuous motion process/mechanism. However, other manufacturing systems, techniques and process can be employed for the formation and sealing steps and stages without deviating from the scope of the present invention. For instance, various embodiments will form and seal the various portions of the bubble valve element using a linear, intermittent motion, machine using heat seals. The various seals could be made using ultrasonic seals or other known sealing processes and techniques.

As shown in FIGS. 18-19, the reel of bubble valve elements 130 in the serial chain 134 can be spiral wound onto a spool 132 such that individual bubble valve elements 130 can be cut or otherwise removed from the spool and placed and sealed into the desired pouch or package.

FIGS. 20-25 show exemplary pouches or packages 140 with the bubble valve element/device 130 attached, sealed, or otherwise incorporated at a portion of the pouches or packages 140. The bubble valve elements 130 are configured to prevent the liquid (low or high viscosity) from passing by the bubble valve element 130 and exiting the pouch until enough pressure is exerted on the pouch or package 140 to force the liquid past the pressurized and entrapped air in the bubble valve element 130 though the valve channel that was created between the two forming web layers 110, 112. In addition, the precision construct of the bubble valve element 130 of the present invention also ensures that liquid product will not leak (even thin, low viscosity liquid) via the bubble valve element 130 when the pouches or packages 140 are tipped over or inverted (e.g., turned upside down). Various embodiments can include one or more removable pouch/film sections 142 including tear areas 144 defined by laser scores, perforations, weakened areas, and the like, to facilitate tear-away or removal of the section 142 by the consumer or user and provide access to and use of the bubble valve element 130.

With regard to packaging including the bubble valve element 130, side, front, back, and bottom panel portions, gusseted or non-gusseted, may also be included. The panel portions are often referred to as webs, films, or layers. References to "top," "bottom," "front," "side," "back" and the like are for illustrative purposes only and are not meant to limit the scope of the disclosed invention.

The package for use with the invention can include packages constructed, in whole or in part, of flexible, rigid, semi-rigid, or semi-flexible materials or panels. Briefly, the package panel portions are generally constructed of flexible sheet material such as PE, Polyester, Nylon, metal foil, PP, or PE or PP laminated, or otherwise bonded, with other materials such as Nylon, Polyester, and like films. To provide for increased barrier properties, embodiments can use composite or laminate layers of said materials and materials of the like. Generally, in such composite or laminate embodiments, a material having preferred sealing characteristics can be joined, bonded, or laminated to a material having a different preferred characteristic (e.g., beneficial oxygen barrier properties). Regardless, single sheets, composites/laminates, and a myriad of other materials and techniques known to one skilled in the art may be implemented based on particular usage and manufacturing needs, without deviating from the spirit and scope of the present invention.

In various embodiments, panel portions will be formed of one contiguous web material. In other embodiments, at least one of the panel portions can be distinct web materials joined or sealed to other respective panel portions to form the pouches or packages of the present invention.

The present invention may be embodied in other specific forms without departing from the spirit or essential attributes thereof, and it is, therefore, desired that the present embodiments be considered in all respects as illustrative and not restrictive. Similarly, the above-described methods and techniques for forming the present invention are illustrative processes and are not intended to limit the methods of manufacturing/forming the present invention to those specifically defined herein. A myriad of various unspecified steps and procedures can be performed to create or form the inventive packages. Further, features and aspects of the various embodiments described herein can be combined to form additional embodiments within the scope of the invention even if such combination is not specifically described herein.

References to front, back, and side panels for the corresponding package described herein are provided to facilitate an understanding of orientation and direction and are not intended to be limiting. For instance, closure devices, access devices, filling devices, seals, and other structures or portions of the package, can be provided to or along any portion of the package regardless of the references herein to front, back, side, bottom, and the like.

What is claimed is:

1. A method of forming a bubble valve device, comprising:
   feeding a first film layer web and a second film layer web into a channel seal station to form one or more channel seals, defining one or more fluid channels, between the first film layer web and the second film layer web, and to seal the first film layer web and the second film layer web together to define a combined film layer web;
   feeding the combined film layer web into a forming station to create a plurality of bubble pockets in both the first film layer web and the second film layer web at a same time, wherein the forming station includes a plurality of cavities to receive the combined film layer web and form the plurality of bubble pockets; and
   feeding the combined film layer web, including the formed plurality of bubble pockets, into a lidding station to create a bubble valve device web including a plurality of formed bubble valve devices, wherein a lidding film layer web is sealed under the plurality of bubble pockets formed in the combined film layer web to trap a gas between the combined film layer web and the lidding film layer web within the plurality of bubble pockets.

2. The method of claim 1, further comprising receiving the bubble valve device web at a registration punch station to punch out a portion of the bubble valve device web for each of the plurality of formed bubble valve devices.

3. The method of claim 1, further comprising receiving the bubble valve device web at a winder station to spool the bubble valve device web including the plurality of formed bubble valve devices.

4. The method of claim 1, wherein at least a portion of the one or more channel seals is flattened or tapered to control flow of a fluid through the one or more fluid channels defined by the one or more channel seals.

5. The method of claim 4, wherein the fluid is a low viscosity liquid.

6. The method of claim 1, wherein the first film layer web comprises at least a first layer and a second layer.

7. The method of claim 6, wherein the first layer of the first film layer web is constructed of Polyethylene (PE) material.

8. The method of claim 6, wherein the second layer of the first film layer web is constructed of a Polypropylene (PP) material.

9. The method of claim 1, wherein the second film layer web comprises at least a first layer and a second layer.

10. The method of claim 9, wherein the first layer of the second film layer web is constructed of a PP material.

11. The method of claim 9, wherein the second layer of the second film layer web is constructed of a PE material.

12. The method of claim 1, wherein the lidding film layer web comprises at least a first layer and a second layer.

13. The method of claim 12, wherein the first layer and the second layer of the lidding film layer web are constructed of a PE material.

14. The method of claim 1, wherein a plurality of bubble seals are applied around the formed plurality of bubble pockets.

15. The method of claim 14, wherein the plurality of bubble seals extend into the one or more fluid channels and across the one or more channel seals.

16. The method of claim 1, wherein the forming station includes a rotary forming die machine or a linear, intermittent motion, machine.

* * * * *